US009961335B2

United States Patent
Yu et al.

(10) Patent No.: US 9,961,335 B2
(45) Date of Patent: May 1, 2018

(54) PICKUP OF OBJECTS IN THREE-DIMENSIONAL DISPLAY

(71) Applicant: BEIJING ZHIGU RUI TUO TECH CO., LTD., Beijing (CN)

(72) Inventors: Kuifei Yu, Beijing (CN); Lin Du, Beijing (CN); Hongjiang Zhang, Beijing (CN)

(73) Assignee: Beijing Zhigu Rui Tuo Tech Co., Ltd., Beijing (CN)

( * ) Notice: Subject to any disclaimer, the term of this patent is extended or adjusted under 35 U.S.C. 154(b) by 189 days.

(21) Appl. No.: 14/904,830

(22) PCT Filed: Jul. 2, 2014

(86) PCT No.: PCT/CN2014/081467
§ 371 (c)(1),
(2) Date: Jan. 13, 2016

(87) PCT Pub. No.: WO2015/035822
PCT Pub. Date: Mar. 19, 2015

(65) Prior Publication Data
US 2016/0173864 A1    Jun. 16, 2016

(30) Foreign Application Priority Data

Sep. 13, 2013  (CN) .......................... 2013 1 0418251

(51) Int. Cl.
*H04N 13/04*   (2006.01)
*H04N 13/02*   (2006.01)
(Continued)

(52) U.S. Cl.
CPC ......... *H04N 13/0484* (2013.01); *G06F 3/013* (2013.01); *H04N 13/00* (2013.01); *H04N 13/0296* (2013.01)

(58) Field of Classification Search
None
See application file for complete search history.

(56) References Cited

U.S. PATENT DOCUMENTS

2011/0025977 A1* 2/2011 Yoo ........................ A61B 3/032
  351/203
2012/0290401 A1* 11/2012 Neven .................... A61B 3/113
  705/14.68

(Continued)

FOREIGN PATENT DOCUMENTS

CN      102542611 A      7/2012
CN      102957931 A      3/2013
(Continued)

OTHER PUBLICATIONS

Office Action for Chinese Application No. 201310418251.7, dated Jan. 27, 2015, (with English Translation), 12 pages.
(Continued)

*Primary Examiner* — Reza Aghevli

(57) ABSTRACT

A pickup device and method for an object in three-dimension display are disclosed. The device comprises a gaze point information acquisition module for acquiring a first location information about a gaze point of an eye of a user with respect to the user; and an object determination module for determining an object picked up by the user according to a second location information about the user in a display space, motion posture information about the user, the first location information and distribution information about objects in the display space. A technical solution of the present application determines an object picked up by a user by means of the location of a gaze point of an eye, making it natural and convenient to pick up an object in a three-dimension display space.

25 Claims, 8 Drawing Sheets

(51) Int. Cl.
*H04N 13/00* (2018.01)
*G06F 3/01* (2006.01)

(56) References Cited

U.S. PATENT DOCUMENTS

| 2013/0050432 A1* | 2/2013 | Perez | H04N 13/0278 348/47 |
| 2014/0361996 A1* | 12/2014 | Eden | G06F 3/013 345/173 |

FOREIGN PATENT DOCUMENTS

| CN | 103475893 A | 12/2013 |
| JP | 2676870 B2 | 7/1990 |

OTHER PUBLICATIONS

Office Action for Chinese Application No. 201310418251.7, dated Aug. 19, 2015, (with English Translation), 14 pages.
PCT International Search Report and Written Opinion dated Oct. 9, 2014, issued in corresponding International Application No. PCT/CN2014/081467 (8 pages).

* cited by examiner

PICKUP OF OBJECTS IN THREE-DIMENSIONAL DISPLAY

CROSS-REFERENCE TO RELATED APPLICATION

The present application is a national stage application of International Application No. PCT/CN2014/081467, filed on Jul. 2, 2014, which claims priority to and benefits of Chinese Patent Application No. 201310418251.7, entitled "Pickup device for objects in three-dimension display and pickup method for objects in three-dimension display," filed on Sep. 13, 2013. The contents of both of the above-referenced applications are incorporated herein by reference in their entirety.

TECHNICAL FIELD

The present application relates to three-dimensional display interaction, e.g., to a pickup device and method for an object in three-dimensional display.

BACKGROUND

As three-dimensional (or to be used interchangeably-three-dimension, or 3 Dimension) display technology develops, the interaction mode and method corresponding thereto become of increasing interest. The selection of an object in the contents of a three-dimensional display is a main step to interact with three-dimension display technology.

However, it is difficult to select an object in a three-dimension space, since a user generally moves his/her location (or a part of his/her body, such as a hand) to select the object, and in the case of some occasions with a relatively large scene, the user generally moves his/her location in a large range, leading to an inconvenient operation.

Furthermore, by way of example, for true three-dimension display based on volumetric pixel (also known as dynamic body scan), since a displayed three-dimension image is formed by rotation of a display face, selecting an object for interaction can be challenging.

SUMMARY

The following presents a simplified summary in order to provide a basic understanding of some aspects disclosed herein. This summary is not an extensive overview. It is intended to neither identify key or critical elements nor delineate the scope of the aspects disclosed. Its sole purpose is to present some concepts in a simplified form as a prelude to the more detailed description that is presented later.

An example, non-limiting objective of the present application is to provide a pickup technology for an object in three-dimension display.

To these and/or related ends, in a first embodiment, the present application provides a pickup device, comprising a memory that stores executable modules, and a processor, coupled to the memory, that executes the executable modules to perform operations of the pickup device, the executable modules comprising a gaze point information acquisition module, configured to acquire a first location information about a gaze point of an eye of a user with respect to the user. The pickup device further comprises an object determination module, configured to determine an object that was picked up according to a second location information about the user in a display space, motion posture information about the user, the first location information and distribution information about at least one object in the display space.

In a second embodiment, the present application provides a method, comprising acquiring, by a device comprising a processor, a first location information about a gaze point of an eye of a user with respect to the user, and determining an object, determined to have been picked up by the user, according to a second location information about the user in a display space, motion posture information about the user, the first location information and distribution information about at least one object in the display space.

In a third embodiment, the present application provides a non-transitory computer-readable tangible media having at least one executable instruction stored thereon that when executed by a processor, causes the processor to perform operations, comprising acquiring a first location information about a gaze point of an eye of a user with respect to the user, and determining an object picked up by the user according to a second location information about the user in a display space, motion posture information about the user, the first location information and distribution information about at least one object in the display space.

In a fourth embodiment, the present application provides a pickup device, comprising a processing device and a memory, wherein the memory stores a computer-executable instruction, the processing device is connected with the memory via a communication bus, and when the pickup device operates, the processing device executes the computer-executable instruction stored in the memory, the pickup device executes operations, comprising acquiring a first location information about a gaze point of an eye of a user with respect to the user, and determining an object picked up by the user according to a second location information about the user in a display space, motion posture information about the user, the first location information and distribution information about at least one object in the display space.

At least one technical solution of one or more of the embodiments of the present application determines an object picked up by a user according to the location of a gaze point of an eye of the user, making it natural and convenient to pick up an object in a three-dimension display space and exhibiting a high pickup accuracy rate relative to conventional approaches. For some three-dimension display spaces with a relatively large scene, a user need not move back and forth entirely or move some parts (for example, hands) in a large amplitude to pick up a desired object, and an object can be optionally selected with only the gaze of eyes, enabling an object to be selected more conveniently, and for some three-dimension display spaces with a relatively large number of objects in a scene, the accuracy and efficiency of determining an object to be picked up by means of the location of a gaze point of an eye of the user are enhanced, thereby enhancing the user experience.

DETAILED DESCRIPTION

The method and device of the present application are described in detail hereinafter with reference to the accompanying drawings and embodiments.

Figure 1:
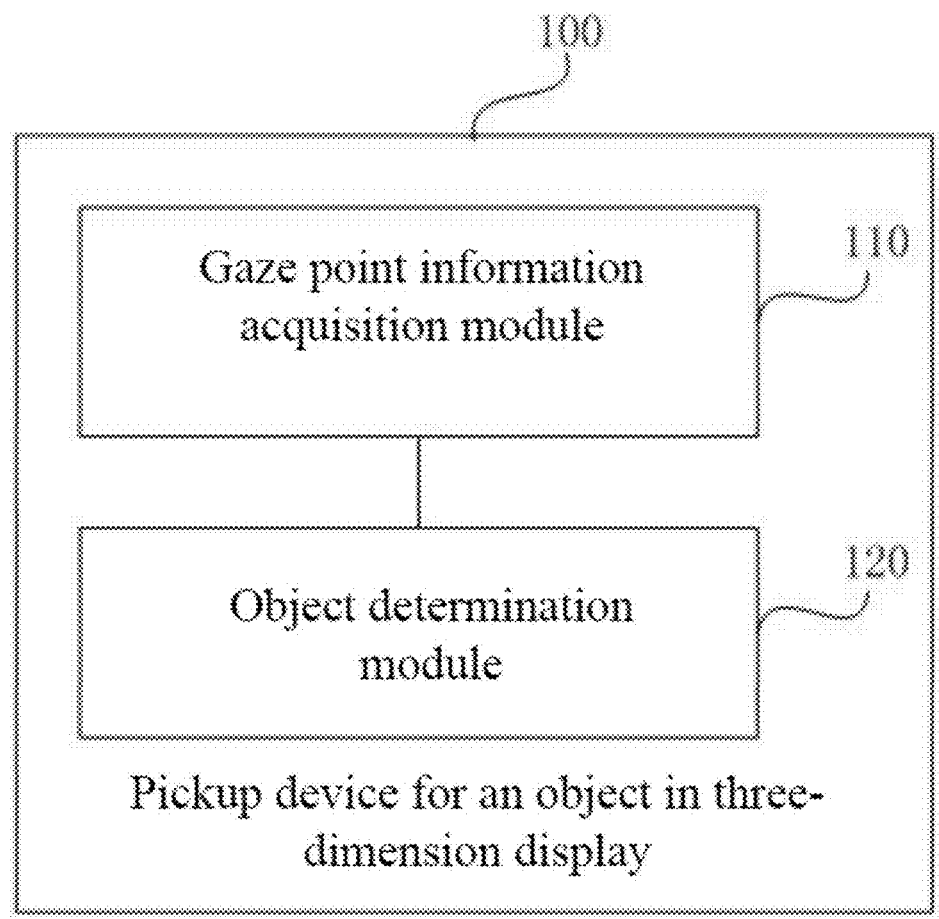
FIG. 1 is an example structural schematic block diagram of a pickup device for an object in three-dimension display of the embodiments of the present application.

There are often low pickup efficiency, inconvenient user operation and other problems with picking up an object in a three-dimension display space, and these problems are more prominent especially in the case that the pickup-able objects in a three-dimension display space are distributed densely and the scene of a three-dimension display space is large. Accordingly, as shown in FIG. 1, the embodiments of the present application provide a pickup device for an object in three-dimension display 100, comprising:

a gaze point information acquisition module 110 for acquiring a first location information about a gaze point of an eye of a user with respect to the user; and an object determination module 120 for determining an object picked up by the user according to a second location information about the user in a display space, motion posture information about the user, the first location information and distribution information about at least one object in the display space.

In the embodiments of the present application, the three-dimension display space mainly is a true three-dimension display space, that is to say, the object displayed in the display space has a physical depth difference, and the nearby object seen by a user is actually relatively close to the user, such as a stereo display space formed by volumetric pixel technology, a stereo display space formed by static imaging technology or a three-dimension holographic display space.

In the embodiments of the present application, the object picked up by the user can be a virtual object in a three-dimension display space, and can also be an object actually present in the space, or still can be an area in the three-dimension display space (for example, when the user interacts with the three-dimension display space, an area is selected and a new virtual object is added in the area).

In a possible implementation of the embodiments of the present application, the gaze point information acquisition module can be a gaze point location detection module, which acquires location information about the current gaze point of an eye of a user with respect to the user by means of real-time detection; or the gaze point information acquisition module acquires location information about the gaze point with respect to the user by way of receiving a detection result of an external detection device via an information receiving module (for example, a communication module described below).

The embodiments of the present application determine an object picked up by a user by means of the location of a gaze point of an eye, making it natural and convenient to pick up an object in a three-dimension display space and having high pickup accuracy rate.

In a possible implementation of the embodiments of the present application, the device further comprises:

a locating module for acquiring the second location information about the user in the display space.

In a possible implementation, the locating module can be an indoor locating device (in this case, the three-dimension display space generally is an indoor space), such as an indoor locating device based on a wireless sensor network, etc., or can also be other devices capable of realizing indoor locating.

In another possible implementation, the locating module can be an outdoor locating device (in this case, the three-dimension display space generally is an outdoor space), such as a global positioning system, etc.; of course, it can be appreciated by those skilled in the art that other locating modules capable of realizing outdoor locating can also be applied to the implementations of the embodiments of the present application, which will not be described here.

In a possible implementation of the embodiments of the present application, the device further comprises:

at least one motion posture sensor for acquiring the motion posture information about the user.

The motion posture information about the user described here mainly comprises head motion and orientation information (including orientations in a left and right direction and in an up and down direction) of the user.

In a possible implementation of the embodiments of the present application, the device further comprises a communication module for acquiring distribution information about at least one object in the display space, for example, capable of acquiring distribution information about all objects in the display space. The distribution information about an object in the display space can be included in metadata corresponding to the displaying of a display apparatus, which is transferred to the device of the embodiments of the present application via the communication module. Of course, when the objects in the display space are distributed still, the distribution information about the at least one object in the display space can also be pre-stored in the device.

The communication module of the embodiments of the present application can be a wired communication module, and can also be a wireless communication module.

In a possible implementation of the embodiments of the present application, the locating module and/or motion posture sensor described above are(is) used as an external apparatus rather than a part of the device of the present application, collect(s) the current location and/or motion posture information about a user in a display space respectively, and transfer(s) same to the device of the embodiments of the present application via the communication module.

In a possible implementation of the embodiments of the present application, the object determination module comprises:
  a gaze point spatial location determination unit for determining the relative location of the gaze point in the display space according to the second location information, the motion posture information and the first location information; and
  an object determination unit for determining the object picked up by the user according to the relative location of the gaze point in the display space and the distribution information about the at least one object in the display space.

In this implementation, the device can determine the coordinates of a user in a display space, the orientation of his/her face and other information according to location and motion posture information about the user in the display space, then can calculate to obtain location information about a gaze point in the display space according to the location information about the gaze point with respect to the user, and further match distribution information about objects in the display space to find out the object picked up by the user.

In a possible implementation of the embodiments of the present application, the gaze point information acquisition module can be one of the followings:
  a) detecting the optical axis direction of one eye using a pupil direction detector, and then obtaining the location of a gaze point of the sight line of the eye by means of distribution information about objects in a three-dimension display space in the optical axis direction of the eye, while this technology is an existing technology, and will not be described in this implementation.
  b) Detecting the optical axis directions of both eyes respectively, and then obtaining the intersection point of the optical axis directions of both eyes to obtain the location of a gaze point of the sight lines of the eyes, while this technology is also an existing technology, and will not be described here.
  c) Obtaining the location of a gaze point of the sight line of an eye according to at least one optical parameter of the optical path between an image collection submodule and the eye when a clearest image presented on the imaging plane of the eye is collected. In this implementation, the gaze point information acquisition module can be one of the following gaze point information acquisition modules as shown in FIG. 2 to FIG. 7.

In the three kinds of gaze point information acquisition modules mentioned above, the object pickup efficiency and accuracy rate of the former two will be reduced when the distribution of pickup-able objects in a three-dimension display space is relatively dense, so in the embodiments of the present application, location information about a gaze point of an eye of a user with respect to the user can be acquired by means of the third kind of gaze point information acquisition module.

Of course, it can be appreciated by those skilled in the art that, in addition to the several gaze point information acquisition modules described above, other devices, which can be used to detect a gaze point of an eye of a user, can also be used as a gaze point information acquisition module in the device of the embodiments of the present application.

Figure 2:
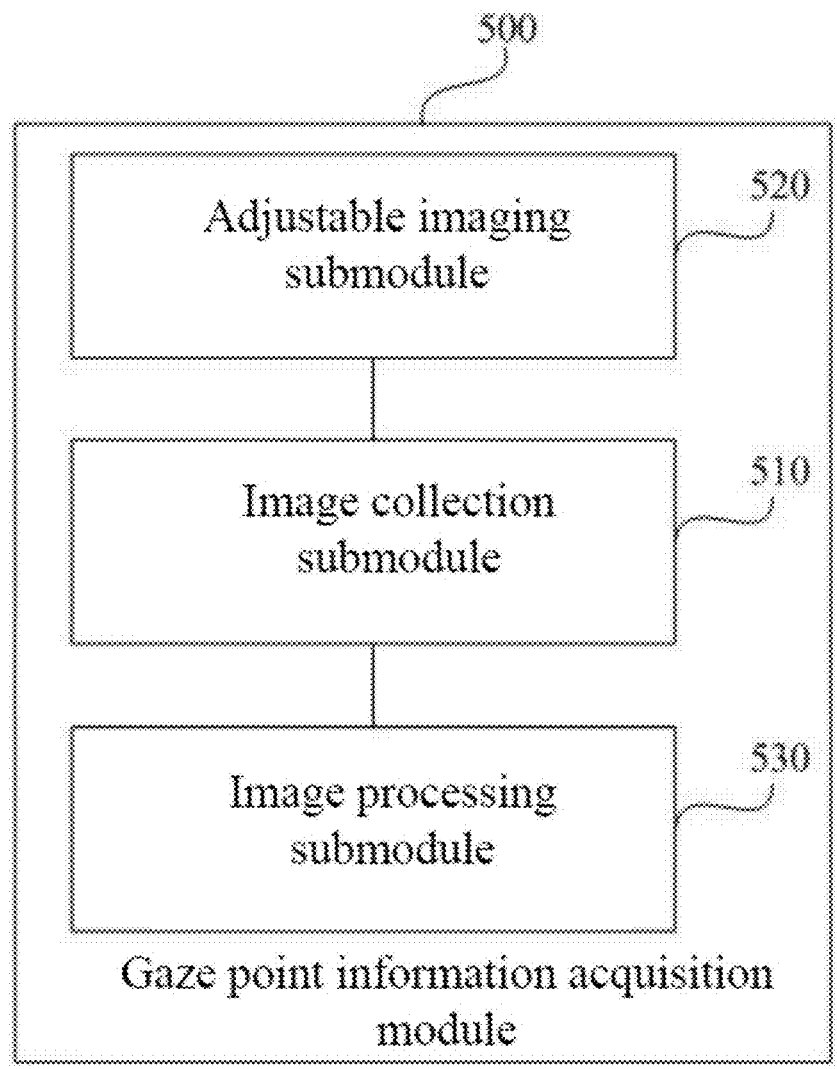
FIG. 2 is an example structural block diagram of a gaze point information acquisition module of a pickup device for an object in three-dimension display of the embodiments of the present application.

As shown in FIG. 2, in a possible implementation of the embodiments of the present application, the gaze point information acquisition module 500 comprises:
  an image collection submodule 510 for collecting at least one image of a fundus of the user;
  an adjustable imaging submodule 520 for adjusting at least one imaging parameter of the optical path between the image collection submodule and an eye of the user until the image collection submodule obtains a clearest image; and
  an image processing submodule 530 for processing the image obtained by the image collection submodule, and calculating according to the at least one imaging parameter corresponding to the clearest image and at least one optical parameter of the eye to obtain a first location information about the gaze point of the eye with respect to the user.

Here, the clearest image is the clearest image obtained from the at least one image according to at least one defined clarity criterion. The at least one defined clarity criterion herein can be a criterion for judging the clarity of an image by those skilled in the art, such as resolution and so on.

The gaze point information acquisition module 500 of the embodiments of the present application obtains an optical parameter of an eye when the image collection submodule obtains the clearest image by analyzing and processing the at least one image of the fundus of the eye, so as to calculate the current location of the gaze point of the eye, providing a basis for further realizing a self-adaptive operation for eyes.

The image presented at "fundus" herein mainly is an image presented on the retina, which can be an image of the fundus itself, such as a distribution image of the nerves, blood vessels and the like of the fundus, or can also be an image of other objects projected to the fundus. The eye herein can be a human eye, and can also be an eye of other animals.

Figure 3:
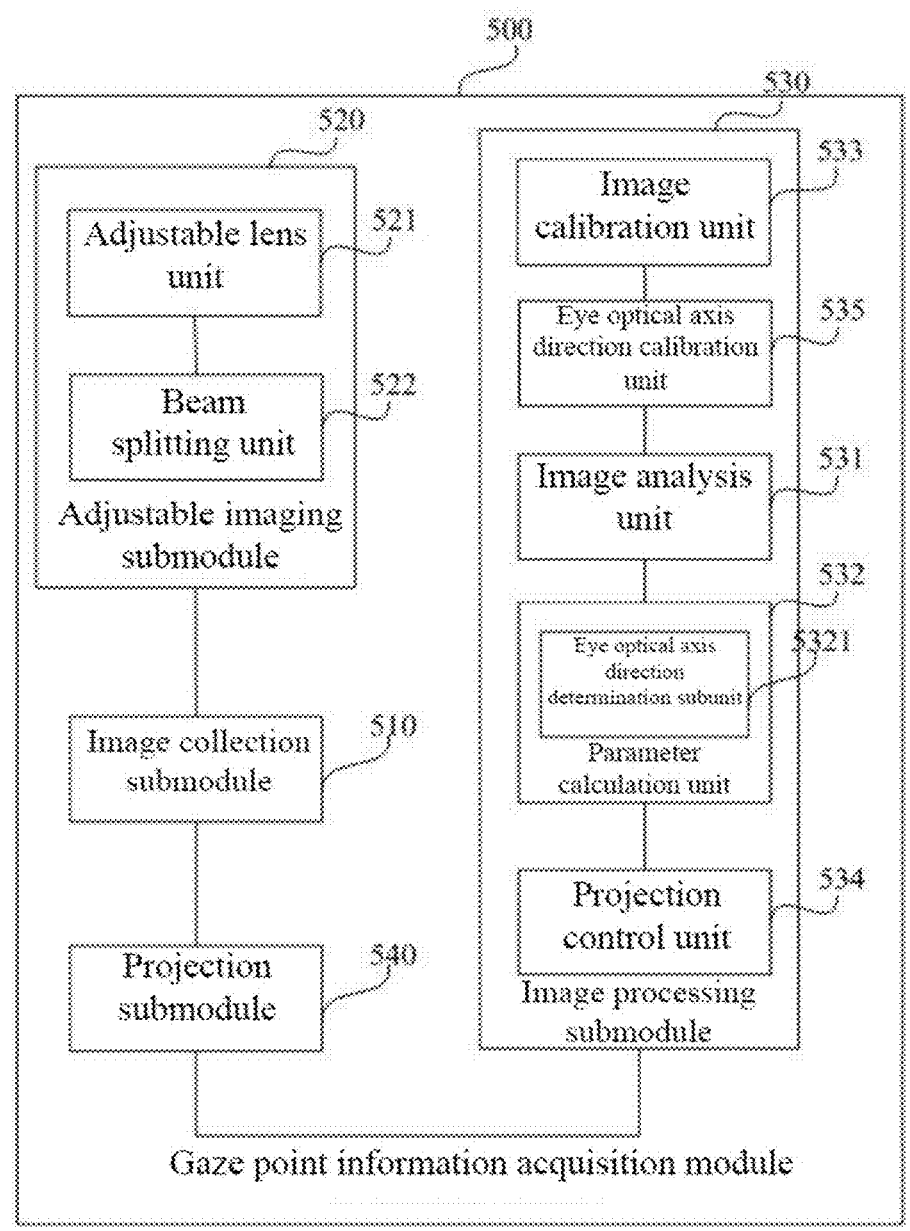
FIG. 3 is an example structural block diagram of another gaze point information acquisition module of a pickup device for an object in three-dimension display of the embodiments of the present application.

As shown in FIG. 3, in a possible implementation of the embodiments of the present application, the image collection submodule 510 can be a micro camera, and in another possible implementation of the embodiments of the present application, the image collection submodule 510 can also directly use a photosensitive imaging device, such as a CCD device or a CMOS device, etc.

In a possible implementation of the embodiments of the present application, the adjustable imaging submodule 520 comprises: an adjustable lens unit 521 which is located on the optical path between an eye and the image collection submodule 510, and the focal length of which is adjustable and/or the location of which in the optical path is adjustable. The equivalent focal length of an optical system between the eye and the image collection submodule 510 is enabled to be adjustable by means of the adjustable lens unit 521, and by adjusting the adjustable lens unit 521, the image collection submodule 510 is enabled to obtain a clearest image of the fundus in a certain location or state of the adjustable lens unit 521. In this implementation, the adjustable lens unit 521 can be adjusted continuously in real time during detection.

In a possible implementation of the embodiments of the present application, the adjustable lens unit 521 can be a focal length adjustable lens that complete the adjustment of the focal length of its own by adjusting the refractive index and/or the shape of its own. In particular, 1) the focal length is adjusted by adjusting the curvature of at least one face of the focal length adjustable lens, for example, adjusting the curvature of the focal length adjustable lens by increasing or decreasing a liquid medium in a cavity formed by a double-layer transparent layer; 2) the focal length is adjusted by changing the refractive index of the focal length adjustable lens, for example, filling a specific liquid crystal medium in the focal length adjustable lens, and adjusting the arrangement mode of the liquid crystal medium by adjusting the voltage of an electrode corresponding to the liquid crystal medium, to change the refractive index of the focal length adjustable lens.

In another possible implementation of the embodiments of the present application, the adjustable lens unit 521 comprises: a lens set composed of a plurality of lenses for completing the adjustment of the focal length of the lens set itself by adjusting the relative locations of the lenses in the lens set. The lens set can also comprise at least one lens with adjustable imaging parameters, the adjustable imaging parameters comprise an adjustable focal length.

In addition to the abovementioned two methods of changing the optical path parameters of the system by adjusting the characteristics of the adjustable lens unit 521 itself, the optical path parameters of the system can be changed by adjusting the location of the adjustable lens unit 521 on the optical path.

In a possible implementation of the embodiments of the present application, in order not to affect the viewing experience of a user to an observed object, and in order to enable a module to be portably applied to a wearable apparatus, the adjustable imaging submodule 520 further comprises: a beam splitting unit 522 for forming a light transfer path between an eye and the observed object and a light transfer path between the eye and the image collection submodule 510. In this way, the optical path can be folded to reduce the volume of the module, and at the same time, other visual experiences of the user are not affected as far as possible.

In this implementation, the beam splitting unit comprises: a first beam splitting unit which is located between an eye and an observed object, and used for transmitting the light from the observed object to the eye and transferring the light from the eye to an image collection submodule.

The first beam splitting unit can be a beam splitter, a beam splitting optical waveguide (including an optical fiber) or other suitable beam splitting apparatuses.

In a possible implementation of the embodiments of the present application, the image processing submodule 530 of the module comprises an optical path calibration module for calibrating the optical path of the system, for example, aligning and calibrating the optical axis of the optical path, etc., to ensure the precision of measurement.

In a possible implementation of the embodiments of the present application, the image processing submodule 530 comprises:
  an image analysis unit 531 for analyzing images obtained by the image collection submodule to find out a clearest image; and
  a parameter calculation unit 532 for calculating an optical parameter of an eye and the location of a gaze point of the eye with respect to a user according to the clearest image and the known imaging parameters of the module when the clearest image is obtained.

In this implementation, the image collection submodule 510 is enabled to collect the clearest image by means of the adjustable imaging submodule 520, but it needs to find out the clearest image by means of the image analysis unit 531, and then, the optical parameter of the eye can be calculated according to the clearest image and the known optical path parameters of the module. The optical parameter of the eye herein may include the optical axis direction of the eye.

In a possible implementation of the embodiments of the present application, the module further comprises: a projection submodule 540 for projecting a light spot to a fundus. In a possible implementation, the function of the projection submodule can be realized by means of a micro projector.

The light spot projected herein can have no specific pattern and be merely used for lighting the fundus.

Figure 4A:
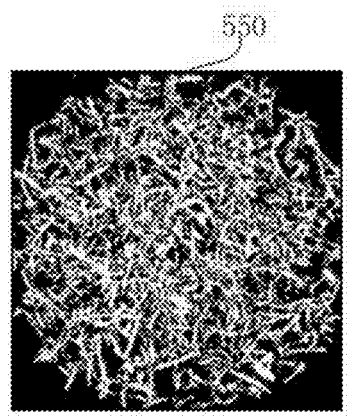
FIG. 4a is an example schematic diagram of a light spot pattern used in a gaze point information acquisition module of a pickup device for an object in three-dimension display of the embodiments of the present application.
Figure 4B:
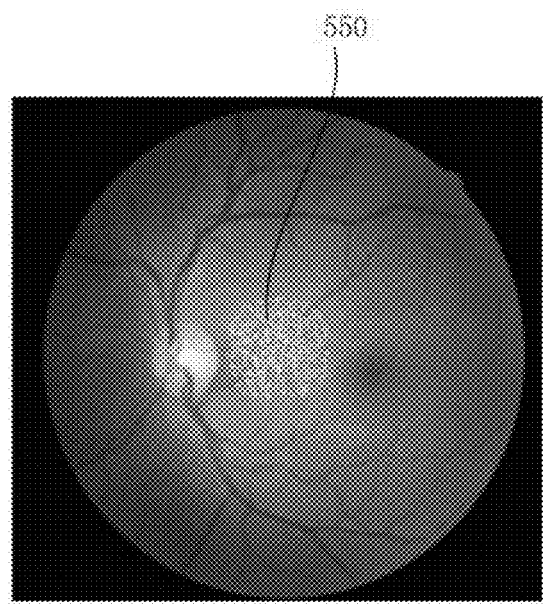
FIG. 4b is an example schematic diagram of a fundus image with a light spot pattern shot by a gaze point information acquisition module of a pickup device for an object in three-dimension display of the embodiments of the present application.

In an implementation of the embodiments of the present application, the projected light spot may include a pattern with abundant features. The abundant features of the pattern can facilitate detection and enhance the detection precision. What is shown in FIG. 4a is an exemplary diagram of a light spot pattern 550, which pattern can be formed by a light spot pattern generator, such as frosted glass; and what is shown in FIG. 4b is an image of a fundus shot when the light spot pattern 550 is projected thereon.

In order not to affect the normal viewing of the eye, the light spot can be an infrared light spot which is invisible to the eye.

At this moment, in order to reduce the interference of other spectra:
  an emergent face of the projection submodule can be provided with an eye-invisible light transmission filter.
  An incident face of the image collection submodule is provided with an eye-invisible light transmission filter.

In a possible implementation of the embodiments of the present application, the image processing submodule 530 further comprises:
  a projection control unit 534 for controlling the brightness of the projected light spot of the projection submodule according to a result obtained by an image analysis module.

For example, the projection control unit 534 can self-adaptively adjust the brightness according to the characteristics of an image obtained by the image collection submodule 510. The characteristics of an image herein include the contrast of image features, texture features, etc.

Here, a special circumstance of controlling the brightness of the projected light spot of the projection submodule is to turn on or turn off the projection submodule, for example, the projection submodule can be turned off periodically when the user continuously fix his/her eyes on one point; and when the fundus of the user is bright enough, a light emitting source can be turned off and the distance from the current gaze point of the sight line of the eye to the eye can be detected only using the information about the fundus.

Furthermore, the projection control unit 534 can also control the brightness of the projected light spot of the projection submodule according to the ambient light.

In a possible implementation of the embodiments of the present application, the image processing submodule 530 further comprises: an image calibration unit 533 for calibrating a fundus image to obtain at least one reference image corresponding to the image presented at the fundus.

The image analysis unit 531 compares the images obtained by the image collection submodule 530 with the reference image and calculates same to obtain the clearest image. Here, the clearest image can be an obtained image with the minimum difference from the reference image. In this implementation, the difference between the images obtained currently and the reference image is calculated by means of an existing image processing algorithm, for example, using a classical phase difference automatic focusing algorithm.

In a possible implementation of the embodiments of the present application, the parameter calculation unit 532 comprises:

an eye optical axis direction determination subunit 5321 for obtaining the optical axis direction of an eye according to the features of the eye when the clearest image is obtained.

The features of the eye herein can be acquired from the clearest image, or can also be acquired otherwise. The optical axis direction of the eye related to the gaze direction of the sight line of the eye.

In a possible implementation of the embodiments of the present application, the eye optical axis direction determination subunit 5321 can be used to obtain the optical axis direction of the eye according to the features of the fundus when the clearest image is obtained. Compared with obtaining the optical axis direction of an eye by means of the features of the pupil and the eyeball surface, the accuracy of obtaining the optical axis direction of an eye by means of the features of the fundus is higher.

When a light spot pattern is projected to the fundus, the size of the light spot pattern may be larger than a visible region of the fundus or smaller than that, wherein:

when the area of the light spot pattern is smaller than or equal to that of the visible region of the fundus, the optical axis direction of an eye can be determined by detecting the location of the light spot pattern on an image with respect to the fundus using a classical feature point matching algorithm (for example, a scale invariant feature transform algorithm);

when the area of the light spot pattern is greater than or equal to that of the visible region of the fundus, the optical axis direction of an eye can be determined by means of the location of the light spot pattern on an image obtained with respect to an original light spot pattern (obtained by an image calibration module) so as to determine the direction of sight line of the user.

In another possible implementation of the embodiments of the present application, the eye optical axis direction determination subunit 5321 can be used to obtain the optical axis direction of an eye according to the features of the eye pupil when the clearest image is obtained. The features of the eye pupil herein can be acquired from the clearest image, and can also be acquired otherwise. Obtaining the optical axis direction of an eye by means of the features of the eye pupil is an existing technology, which will not be described here.

In a possible implementation of the embodiments of the present application, the image processing submodule 530 further comprises: an eye optical axis direction calibration unit 535 for calibrating the optical axis direction of an eye to determine the optical axis direction of the eye more accurately.

In this implementation, the known imaging parameters of the module include a fixed imaging parameter and a real-time imaging parameter, wherein the real-time imaging parameter is parameter information about the adjustable lens unit when a clearest image is acquired, and the parameter information can be obtained by recording in real time when the clearest image is acquired.

Figure 5A:
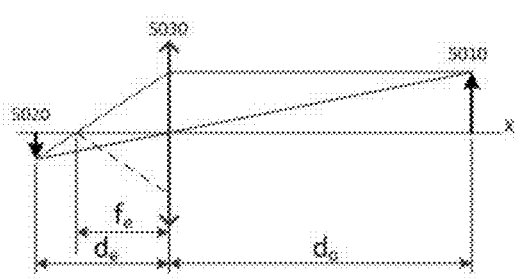
FIG. 5a is an example schematic diagram of an optical path of eye imaging of a gaze point information acquisition module of a pickup device for an object in three-dimension display of the embodiments of the present application.

After the known imaging parameters of an optical path system between an eye and an image collection device has been obtained, the distance from the gaze point of the eye to the eye can be calculated, which is in particular as follows:

what is shown in FIG. 5*a* is a schematic diagram of eye imaging, and equation (1) can be obtained from FIG. 5*a* in combination with the lens imaging equation in the classical optical theory:

$$\frac{1}{d_o} + \frac{1}{d_e} = \frac{1}{f_e} \quad (1)$$

where $d_o$ and $d_e$ are the distance from a current observed object 5010 of an eye to an eye equivalent lens 5030 and the distance from a real image 5020 on the retina to the eye equivalent lens 5030 respectively, $f_e$ is the equivalent focal length of the eye equivalent lens 5030, and X is the optical axis direction of the eye (i.e., the optical axis of the sight line).

Figure 5B:
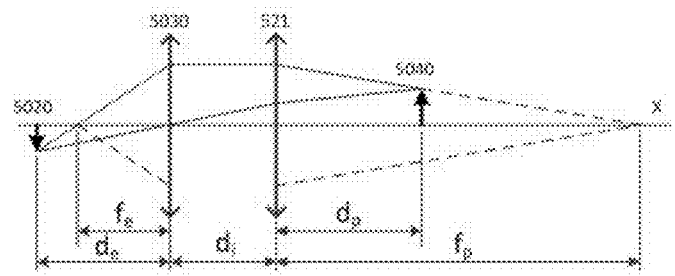
FIG. 5b is an example schematic diagram where a gaze point information acquisition module of a pickup device for an object in three-dimension display of the embodiments of the present application obtains the location of a gaze point of an eye with respect to a user according to known imaging parameters of the system and optical parameters of the eye.

What is shown in FIG. 5*b* is a schematic diagram where the distance from a gaze point of an eye to the eye is obtained according to the known optical parameters of the module and the optical parameters of the eye; in FIG. 5*b*, a light spot 5040 will form a virtual image (not shown in FIG. 5*b*) via an adjustable lens unit 521, and by assuming the distance of the virtual image from the lens to be (not shown in FIG. 5*b*), in combination with the equation (1), the following set of equations can be obtained:

$$\begin{cases} \dfrac{1}{d_p} - \dfrac{1}{x} = \dfrac{1}{f_p} \\ \dfrac{1}{d_i + x} + \dfrac{1}{d_e} = \dfrac{1}{f_e} \end{cases} \quad (2)$$

where $d_p$ is the optical equivalent distance from the light spot 5040 to the adjustable lens unit 521, $d_i$ is the optical equivalent distance from the adjustable lens unit 521 to the eye equivalent lens 5030, and $f_p$ is the focal length value of the adjustable lens unit 521.

The distance $d_o$ from the current observed object 5010 (the gaze point of the eye) to the eye equivalent lens 5030 can be obtained as shown in equation (3) from (1) and (2):

$$d_o = d_i + \frac{d_p \cdot f_p}{f_p - d_p} \quad (3)$$

According to the distance from the observed object 5010 to the eye obtained by the calculation described above, and the optical axis direction of the eye which can be obtained as a result of the preceding description, the location information about the gaze point of the eye with respect to a user can be obtained easily, providing a basis for subsequent further interaction associated with the eye.

Figure 6:
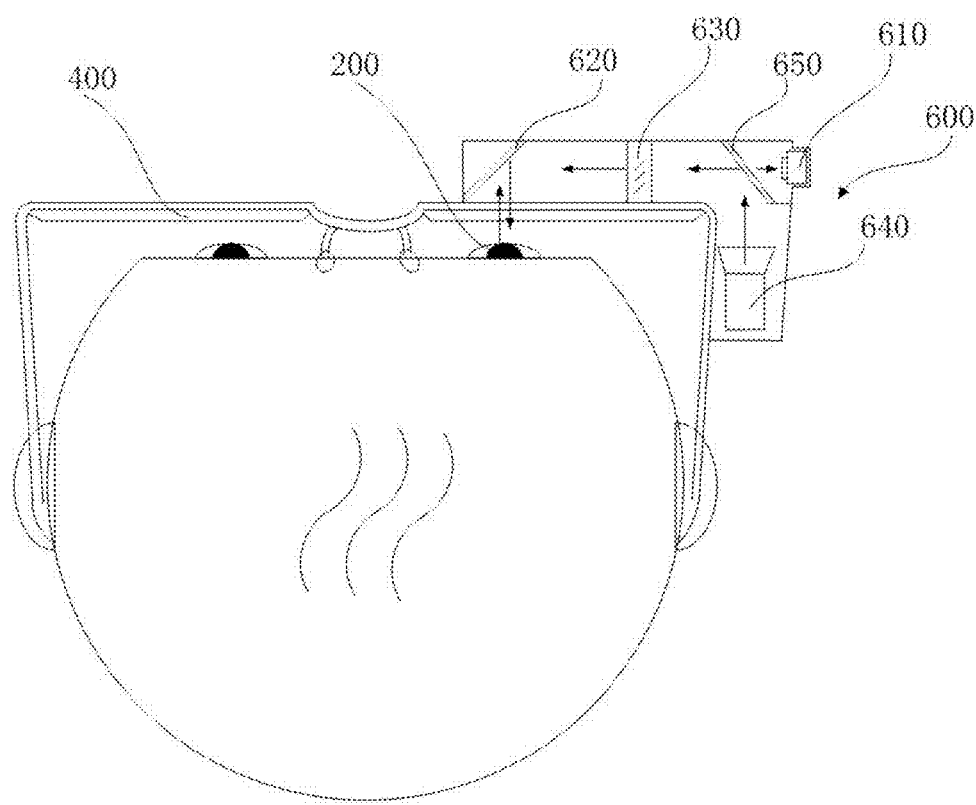
FIG. 6 is an example schematic diagram of a gaze point information acquisition module of a pickup device for an object in three-dimension display of the embodiments of the present application applied to spectacles.

What is shown in FIG. 6 is an embodiment of applying a gaze point information acquisition module 600 in a possible implementation of the embodiments of the present application to spectacles 400, which comprises the contents described in the implementation as shown in FIG. 3, and is in particular as follows: it can be seen from FIG. 6 that, in this implementation, a module 600 of this implementation is integrated to the right side of the spectacles 400 and comprises:

a micro camera 610 which functions the same as the image collection submodule described in the implementation of FIG. 3, and is arranged at the outer right side of an eye 200 in order not to affect the sight line of a user normally viewing an object;

a first beam splitter 620 which functions the same as the first beam splitting unit described in the implementation of FIG. 3, is arranged with a certain tilt angle at the intersection point of the gaze direction of the eye 200 and the incident direction of the camera 610, and transmits the light entering the eye 200 from an observed object and reflects the light from the eye to the camera 610; and a focal length adjustable lens 630 which functions the same as the focal length adjustable lens described in the implementation of FIG. 3, is located between the first beam splitter 620 and the camera 610, and adjusts the focal length value in real time, so that the camera 610 can shoot a clearest image of the fundus at some focal length value.

In this implementation, the image processing submodule is not shown in FIG. 6, and functions the same as the image processing submodule as shown in FIG. 3.

Since the brightness of the fundus is not enough under normal circumstances, the fundus had better be illuminated, and in this implementation, the fundus is illuminated by a light emitting source 640. In order not to affect the user experience, the light emitting source 640 herein can be an eye-invisible light emitting source, for example, can be a near-infrared light emitting source which does not affect the eye 200 much and to which the camera 610 is relatively sensitive.

In this implementation, the light emitting source 640 is located at the outer side of the right side of a spectacle frame, so it needs a second beam splitter 650 together with the first beam splitter 620 to complete the transferring of the light emitted by the light emitting source 640 to the fundus. In this implementation, the second beam splitter 650 is also located in front of the incident face of the camera 610, so it needs to transmit the light from the fundus to the camera 610.

It can be seen that in this implementation, in order to enhance the user experience and enhance the collection definition of the camera 610, the first beam splitter 620 can have the characteristics of high reflectivity to infrared and high transmissivity to visible light. For example, an infrared reflective film can be arranged at one side of the first beam splitter 620 facing the eye 200 to realize the characteristics described above.

It can be seen from FIG. 6 that, since in this implementation, the gaze point information acquisition module 600 is located at one side of the lens of the spectacles 400 away from the eye 200, the lens can be considered as a part of the eye 200 during the calculation of the optical parameters of the eye, without knowing the optical characteristics of the lens.

In other implementations of the embodiments of the present application, the gaze point information acquisition module 600 may be located at one side of the lens of the spectacles 400 close to the eye 200, and then, it needs to obtain the optical characteristic parameters of the lens in advance and take the affecting factor of the lens into account when the distance from the gaze point to an eye of a user is being calculated.

The light emitted by the light emitting source is reflected by the second beam splitter 650, transmitted by the focal length adjustable lens 630 and reflected by the first beam splitter 620, then transmits through the lens of the spectacles 400 to enter the eye of the user, and finally arrives at the retina of the fundus; and the camera 610 shoots an image of the fundus through the pupil of the eye 200 via an optical path composed of the first beam splitter 620, the focal length adjustable lens 630 and the second beam splitter 650.

Figure 7:
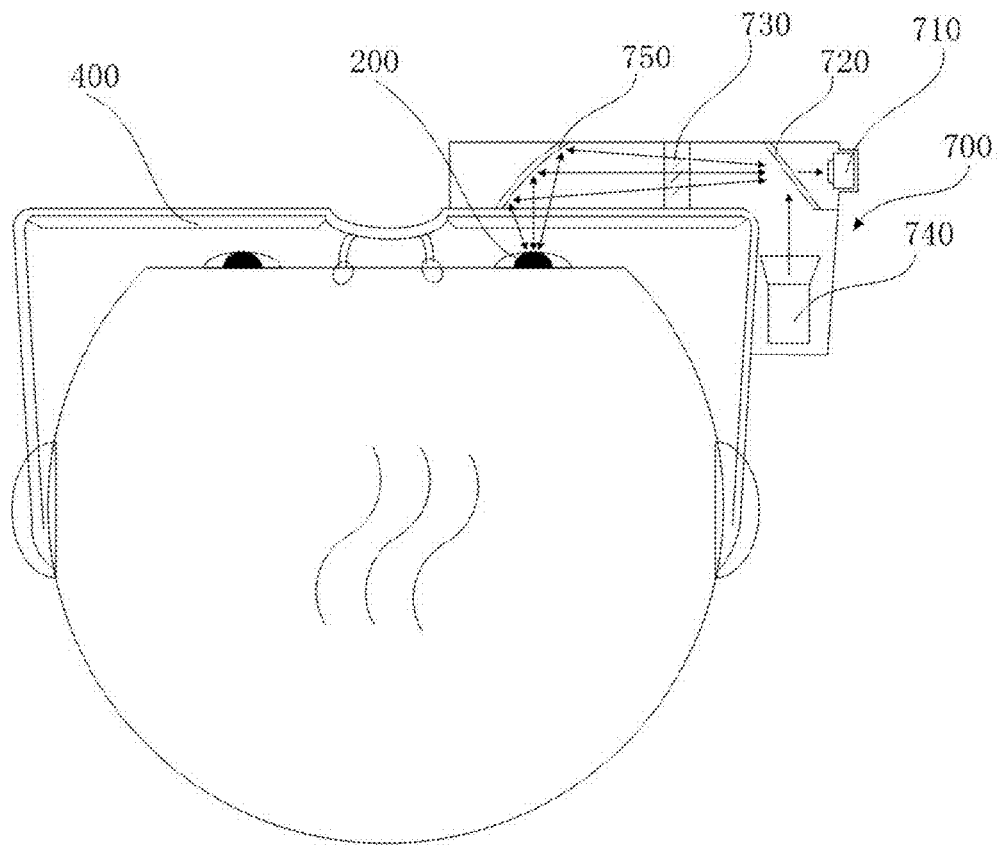
FIG. 7 is an example schematic diagram of a gaze point information acquisition module of another pickup device for an object in three-dimension display of the embodiments of the present application applied to spectacles.

What is shown in FIG. 7 is a structural schematic diagram of a gaze point information acquisition module 700 of another implementation of the embodiments of the present application. It can be seen from FIG. 7 that this implementation is similar to the implementation shown in FIG. 6, comprising a micro camera 710, a second beam splitter 720 and a focal length adjustable lens 730, except that the projection submodule 740 in this implementation is a projection submodule 740 for projecting a light spot pattern, and the first beam splitter in the implementation of FIG. 6 is replaced with a curved beam splitter 750 as a curved beam splitting unit.

The curved beam splitter 750 is adopted here to correspond to the locations of the pupil when the optical axis direction of the eye is different respectively, so as to transfer an image presented at the fundus to an image collection submodule. In this way, the camera can shoot the mixed and superimposed images formed by various angles of the eyeball; however, since only the fundus part through the pupil can clearly focus on the camera, while other parts will defocus and as a result, clear imaging is not achieved, the formed image of the fundus part will not be interfered severely, and the features of the fundus part can still be detected. Therefore, compared with the implementation shown in FIG. 6, this implementation can obtain an image of the fundus well when the gaze direction of the eye is different, so that the gaze point information acquisition module of this implementation has wider scope of application and higher detection precision.

A possible implementation of the embodiments of the present application describes a pickup device for an object in three-dimension display, and the device is arranged on a head-wearable apparatus, for example, on a pair of spectacles, a helmet and other apparatuses, and comprises a gaze point information acquisition module and an object determination module described in the implementation of FIG. 1.

In this implementation, the gaze point information acquisition module is the gaze point information acquisition module as shown in FIG. 2 to FIG. 7 above, and is arranged at one side of a pair of spectacles or a helmet apparatus for detecting location information about a gaze point of an eye of a user with respect to the user. The object determination module is arranged at the user side; for example, the object determination module and the gaze point information acquisition module can be arranged at the user side separately, and can also be integrated together to be arranged, and the functions of the object determination module and the image processing submodule of the gaze point information acquisition module may be completed by one and the same physical apparatus.

Figure 8:
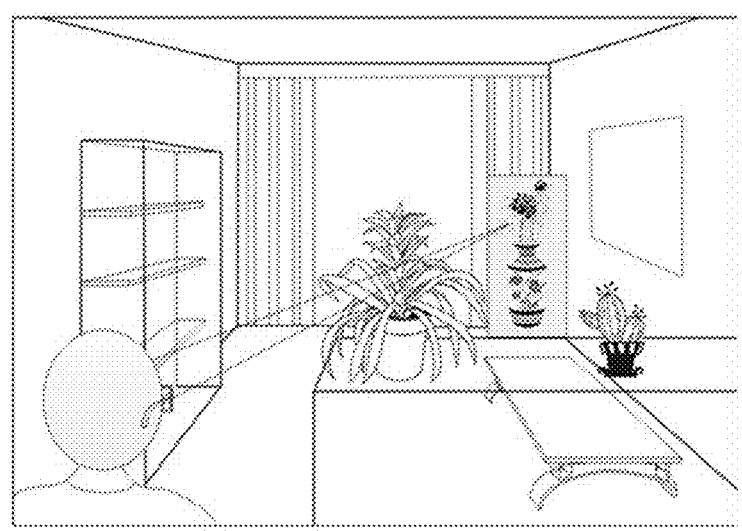
FIG. 8 is an example schematic diagram where a pickup device for an object in three-dimension display of the embodiments of the present application determines a picked-up object in a three-dimension display space.

In this implementation, the device further comprises a communication module for acquiring the current location and motion posture information about the user in a display space and the current distribution information about objects in the display space, and at the same time, also for sending the information about the object picked up to a three-dimension display apparatus so that the user subsequently interacts with the three-dimension display apparatus. For example, in a possible implementation of the embodiments of the present application as shown in FIG. 8, after the object (a vase) picked up by a user has been determined, the device sends pickup information about the corresponding object to a three-dimension display apparatus via the communication module.

In this implementation, the device further comprises: an object information prompting module for prompting corresponding information about an object picked up. For instance, after it is determined that an object has been picked up, the object information prompting module prompts that the object is selected, for example, the object information prompting module displays a selected state (a highlight selected state as shown in FIG. 8) of the object picked up (the vase) by means of the three-dimension display apparatus; and furthermore, the corresponding information about an object picked up also comprises the attribute information or operable information about the object, etc. "Prompting" herein comprises: interacting with a three-dimension display apparatus, so that the three-dimension display apparatus displays or sounds a prompt; or prompting on the user side (on the device of the embodiments of the present application, or on other wearable apparatuses), including sound prompting, vibration prompting, or screen displaying on a wearable apparatus, etc.

The attribute information about the object comprises introductions on the color, shape, function and so on of the object picked up; and the operable information about the object comprises information about various operations which can be performed on the object picked up, such as one or more of operation information about (not limited to) tagging, querying, deleting, copying, cutting, pasting, moving, rotating and morphing the object picked up.

Of course, in the implementations of the embodiments of the present application, the device of the embodiments of the present application can be adopted to pick up a plurality of objects in turn.

Another possible implementation of the embodiments of the present application describes a pickup device for an object in three-dimension display, comprising a gaze point information acquisition module and an object determination module described in the implementation of FIG. 1, wherein the gaze point information acquisition module is the gaze point information acquisition module as shown in FIG. 2 to FIG. 7 above, and is arranged at one side of a head-wearable apparatus, such as a pair of spectacles or a helmet apparatus, for detecting location information about a gaze point of an eye of a user with respect to the user. Unlike the implementations above, in this implementation, the object determination module is arranged at the three-dimension display apparatus side, for example, can be integrated in a three-dimension display apparatus. The device further comprises a communication module; and the communication module acquires the current location and motion posture information about the user in a display space, and is also used for completing information interaction between the gaze point information acquisition module and the object determination module, including: sending to the object determination module location information about a gaze point of an eye of the user with respect to the user.

In yet another possible implementation of the embodiments of the present application, the functions of the pickup device for an object in three-dimension display are similar to the implementations above except that the gaze point information acquisition module receives location information about a gaze point of an eye of a user with respect to the user from an external apparatus rather than detects the location of the gaze point by itself. In this case, the pickup device for an object in three-dimension display can be arranged at the user side, and can also be arranged at the three-dimension display apparatus side.

Figure 9:
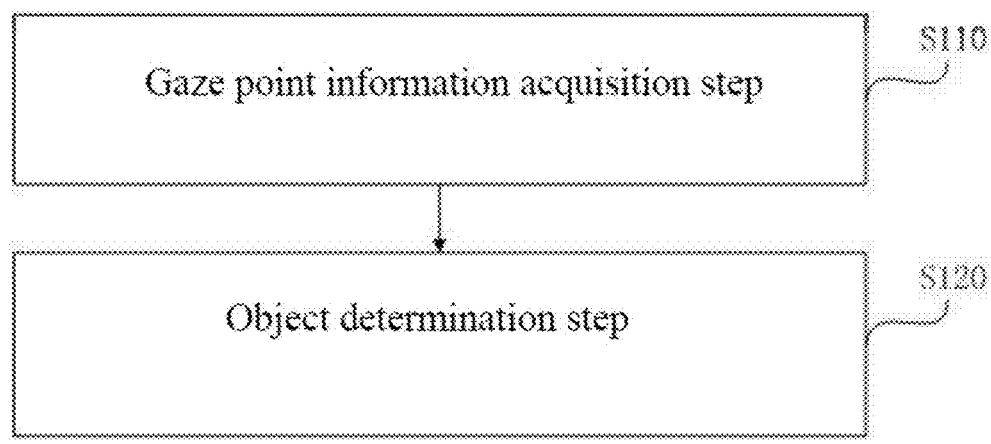
FIG. 9 is an example flowchart of a pickup method for an object in three-dimension display of the embodiments of the present application.

As shown in FIG. 9, an implementation of the embodiments of the present application provides a pickup method for an object in three-dimension display, comprising:
S110: a gaze point information acquisition step for acquiring a first location information about a gaze point of an eye of a user with respect to the user; and
S120: an object determination step for determining an object picked up by the user according to a second location information about the user in a display space, motion posture information about the user, the first location information and distribution information about at least one object in the display space.

The embodiments of the present application determine an object picked up by a user by means of the location of a gaze point of an eye, making it natural and convenient to pick up an object in a three-dimension display space and having high pickup accuracy rate.

In a possible implementation of the embodiments of the present application, the method further comprises:
acquiring the second location information.

In a possible implementation of the embodiments of the present application, the method further comprises:
acquiring the motion posture information.

In a possible implementation of the embodiments of the present application, the method further comprises:
acquiring the distribution information about the at least one object.

In a possible implementation of the embodiments of the present application, each piece of the information described above can be acquired from the external by means of communication transmission; and in other possible implementations, the second location information and/or the motion posture information can be obtained by detecting via a locating module, a motion posture sensor, etc.

In a possible implementation of the embodiments of the present application, the object determination step comprises:
determining the relative location of the gaze point in the display space according to the first location information, the motion posture information and the first location information; and
determining the object picked up by the user according to the relative location of the gaze point in the display space and the distribution information about the at least one object.

In a possible implementation of the embodiments of the present application, the method further comprises: prompting corresponding information about the object picked up.

In a possible implementation of the embodiments of the present application, corresponding information about the object picked up comprises attribute information about the object picked up.

In a possible implementation of the embodiments of the present application, corresponding information about the object picked up comprises operable information about the object picked up.

In a possible implementation of the embodiments of the present application, operable information about the object picked up comprises:
one or more of operation information about tagging, querying, deleting, copying, cutting, pasting, moving, rotating and morphing the object picked up.

In a possible implementation of the embodiments of the present application, the step S110 comprises:
collecting at least one image of the fundus of the eye;
adjusting at least one imaging parameter of the optical path between the collection location of the at least one image and the eye until at least one image that satisfies at least one defined clarity criterion is collected; and processing the collected image, and obtaining the first location information according to the at least one imaging parameter corresponding to the at least one image that satisfies at least one defined clarity criterion and at least one optical parameter of the eye.

In a possible implementation of the embodiments of the present application, the adjusting the imaging parameters of the optical path between the image collection location and the eye comprises:

adjusting the focal length of a lens unit located on the optical path between the eye and the collection location of the at least one image and/or the location thereof in the optical path.

In a possible implementation of the embodiments of the present application, the gaze point information acquisition step further comprises:

transferring at least one image presented at the fundus to the image collection submodule, and wherein the at least one image respectively correspond to at least one location of the pupil associated with different optical axis directions of the eye.

In a possible implementation of the embodiments of the present application, the gaze point information acquisition step further comprises:

projecting a light spot pattern to the fundus.

The implementation of each step described above is the same as the description of the functions of a corresponding module or unit in the embodiments of the device described above, and will not be described here.

It should be understood that in various embodiments of the present application, the value of the serial number of each procedure described above does not mean an execution sequence, and the execution sequence of each procedure should be determined according to the function and internal logic thereof, and should not be any limitation on the implementation procedure of the embodiments of the present application.

Figure 10:
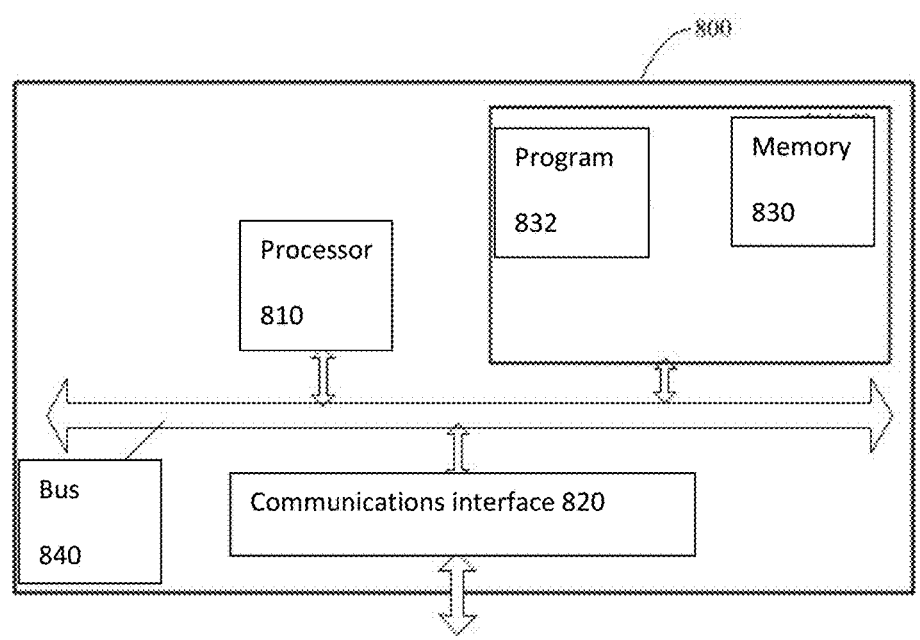
FIG. 10 is an example structural schematic block diagram of an object determination module in still another pickup device for an object in three-dimension display of the embodiments of the present application.

FIG. 10 is a structural schematic diagram of an object determination module 800 of a pickup device for an object in three-dimension display provided in the embodiments of the present application, and the particular embodiments of the present application do not limit the particular realization of the object determination module 800. As shown in FIG. 10, the object determination module 800 may comprise:

a processor 810, a communications interface 820, a memory 830 and a communication bus 840. In this case:

the processor 810, the communications interface 820 and the memory 830 complete mutual communications via the communication bus 840.

The communications interface 820 is used for communicating with a network element such as a client, etc.

The processor 810 is used for executing a program 832, and in particular, can execute relevant steps in the embodiment of the method shown in FIG. 9 above.

In particular, the program 832 may include a program code, the program code including a computer operation instruction.

The processor 810 may be a central processing unit CPU, or an application specific integrated circuit ASIC, or be configured to be one or more integrated circuit which implements the embodiments of the present application.

The memory 830 is used for storing the program 832. The memory 830 may contain a high-speed RAM memory, and may also contain a non-volatile memory, such as at least one magnetic disk memory. In particular, the program 832 is used for:

acquiring a first location information about a gaze point of an eye of a user with respect to the user; and determining an object picked up by the user according to a second location information about the user in a display space, motion posture information about the user in the display space, the first location information and distribution information about at least one object in the display space.

The particular realization of each unit in the program 832 can refer to the corresponding unit in the embodiments shown in FIG. 1 to FIG. 8, and will not be described here. It could be clearly known by those skilled in the art that the particular working procedures of the apparatuses and modules described above can refer to the description of corresponding procedures in the preceding embodiments of the method, and will not be described here in order to make the description convenient and concise.

It can be appreciated by those skilled in the art that each exemplary unit and method step described with reference to the embodiments disclosed in this text can be realized by electronic hardware or a combination of computer software and electronic hardware. Whether these functions are executed in a hardware mode or a software mode depends on the specific applications and design constraint conditions of the technical solution. The professional technicians can use different methods to realize the functions described with respect to each specific application, but this realization should not be considered to go beyond the scope of the present application.

If the function is realized in the form of a software functional unit and is sold or used as an independent product, it can be stored in a computer-readable storage medium. Based on such understanding, the technical solution of the present application essentially or the part which contributes to the prior art or a part of the technical solution can be embodied in the form of a software product, and the computer software product is stored in a storage medium, and comprises several instructions for enabling a computer apparatus (which can be a personal computer, a server, or a network apparatus, etc.) to execute all or some steps of the method described in each embodiment of the present application. The preceding storage medium comprises various media which can store a program code, such as a USB disk, a mobile hard disk, a read-only memory (ROM), a random access memory (RAM), a magnetic disk or a compact disk, etc.

The above implementations are only used to describe the present application, without limiting the present application; various alterations and variants can be made by those skilled in the art without departing from the spirit and scope of the present application, so all equivalent technical solutions also belong to the scope of the present application, and the scope of patent protection of the present application should be defined by claims.

The invention claimed is:

1. A pickup device, comprising:
a memory that stores executable modules; and
a processor, coupled to the memory, that executes the executable modules to perform operations of the pickup device, the executable modules comprising:
a gaze point information acquisition module configured to acquire a first location information, with respect to a user, about a gaze point of an eye of the user; and an object determination module configured to determine an object that was picked up according to a second location information about the user, motion posture information about the user, the first location information and distribution information about a plurality of objects in a display space;

wherein the gaze point information acquisition module comprises:

an image collection submodule configured to collect at least one first image of a fundus of the eye;

an adjustable imaging submodule configured to adjust at least one imaging parameter of an optical path between the image collection submodule and the eye until the image collection submodule obtains at least one second image that satisfies at least one defined clarity criterion; and an image processing submodule configured to process the at least one first image, and obtain the first location information according to the at least one imaging parameter corresponding to the at least one second image that satisfies the at least one defined clarity criterion and at least one optical parameter of the eye.

2. The pickup device of claim 1, wherein the adjustable imaging submodule comprises:

at least one adjustable lens unit located on the optical path, a focal length of the at least one adjustable lens unit being adjustable or at least one location of the at least one adjustable lens unit on the optical path being adjustable.

3. The pickup device of claim 1, wherein the adjustable imaging submodule comprises:

at least one curved beam splitting unit configured to transfer at least one image presented at the fundus to the image collection submodule, and wherein the at least one image respectively correspond to at least one location of a pupil associated with different optical axis directions of the eye.

4. The pickup device of claim 1, wherein the gaze point information acquisition module further comprises:

a projection submodule configured to project at least one light spot pattern to the fundus.

5. The pickup device of claim 1, wherein the executable modules further comprise:

at least one locating module configured to obtain the second location information.

6. The pickup device of claim 1, wherein the executable modules further comprise:

at least one motion posture sensor configured to obtain the motion posture information.

7. The pickup device of claim 1, wherein the executable modules further comprise:

a communication module configured to acquire the distribution information about the plurality of objects.

8. The pickup device of claim 7, wherein the communication module is also configured to acquire the second location information or the motion posture information.

9. The pickup device of claim 1, wherein the object determination module comprises:

a gaze point spatial location determination unit configured to determine the relative location of the gaze point in the display space according to the second location information, the motion posture information and the first location information; and an object determination unit configured to determine the object picked up by the user according to the relative location of the gaze point in the display space and the distribution information about the plurality of objects.

10. The pickup device of claim 1, wherein the executable modules further comprise:

an object information prompting module configured to prompt at least one kind of corresponding information about the object.

11. A method, comprising:

acquiring, by a device comprising a processor, a first location information, with respect to a user, about a gaze point of an eye of the user; and determining an object, determined to have been picked up by the user, according to a second location information about the user, motion posture information about the user, the first location information and distribution information about a plurality of objects in a display space;

wherein acquiring the first location information, with respect to the user, about the gaze point of the eye of the user comprises:

collecting at least one image of a fundus of the eye;

adjusting at least one imaging parameter of an optical path between at least one location of the at least one image and the eye until at least a subset of the at least one image that satisfies at least one defined clarity criterion is collected; and processing the at least one image, and obtaining the first location information according to the at least one imaging parameter corresponding to the at least the subset of the at least one image that satisfies the at least one defined clarity criterion and at least one optical parameter of the eye.

12. The method of claim 11, wherein the adjusting of the at least one imaging parameter of the optical path between the at least one location of the at least one image and the eye comprises:

adjusting a focal length of at least one optical device located on the optical path or respective locations of at least one optical device on the optical path.

13. The method of claim 11, wherein the acquiring the first location information, with respect to the user, about the gaze point of the eye of the user further comprises:

transferring the at least one image presented at the fundus to the image collection submodule, wherein the at least one image respectively correspond to at least one location of a pupil associated with different optical axis directions of the eye.

14. The method of claim 11, wherein the acquiring the first location information, with respect to the user, about the gaze point of the eye of the user further comprises:

projecting at least one light spot pattern to the fundus.

15. The method of claim 11, wherein the method further comprises:

acquiring the second location information.

16. The method of claim 11, wherein the method further comprises:

acquiring the motion posture information.

17. The method of claim 11, wherein the method further comprises:

acquiring the distribution information about the plurality of objects.

18. The method of claim 11, wherein the determining the object comprises:

determining a relative location of the gaze point in the display space according to the first location information, the motion posture information and the first location information; and determining the object according to the relative location of the gaze point in the display space and the distribution information about the plurality of objects.

19. The method of claim 11, wherein the method further comprises: prompting at least one kind of corresponding information about the object.

20. The method of claim 19, wherein the at least one kind of corresponding information about the object comprises a selected state about the object.

21. The method of claim 19, wherein the at least one kind of corresponding information about the object comprises attribute information about the object.

22. The method of claim 19, wherein the at least one kind of corresponding information about the object comprises operability information about the object.

23. The method of claim 22, wherein the operability information about the object comprises one or more of a group, comprising:
    operation information about tagging, querying, deleting, copying, cutting, pasting, moving, rotating or morphing the object.

24. A non-transitory computer-readable tangible media having at least one executable instruction stored thereon that when executed by a processor, causes the processor to perform operations, comprising:
    acquiring a first location information, with respect to a user, about a gaze point of an eye of the user; and
    determining an object picked up by the user according to a second location information about the user, motion posture information about the user, the first location information and distribution information about a plurality of objects in a display space;
    wherein acquiring the first location information, with respect to the user, about the gaze point of the eye of the user comprises:
    collecting at least one image of a fundus of the eye;
    adjusting at least one imaging parameter of an optical path between at least one location of the at least one image and the eye until at least a subset of the at least one image that satisfies at least one defined clarity criterion is collected; and
    processing the at least one image, and obtaining the first location information according to the at least one imaging parameter corresponding to the at least the subset of the at least one image that satisfies the at least one defined clarity criterion and at least one optical parameter of the eye.

25. A pickup device, comprising a processing device and a memory, wherein the memory stores a computer-executable instruction, the processing device is connected with the memory via a communication bus, and when the pickup device operates, the processing device executes the computer-executable instruction stored in the memory, the pickup device executes operations, comprising:
    acquiring a first location information, with respect to a user, about a gaze point of an eye of the user; and
    determining an object picked up by the user according to a second location information about the user, motion posture information about the user, the first location information and distribution information about a plurality of objects in a display space;
    wherein acquiring the first location information, with respect to the user, about the gaze point of the eye of the user comprises:
    collecting at least one image of a fundus of the eye;
    adjusting at least one imaging parameter of an optical path between at least one location of the at least one image and the eye until at least a subset of the at least one image that satisfies at least one defined clarity criterion is collected; and
    processing the at least one image, and obtaining the first location information according to the at least one imaging parameter corresponding to the at least the subset of the at least one image that satisfies the at least one defined clarity criterion and at least one optical parameter of the eye.

* * * * *